G. W. J. CRABB.
DIRIGIBLE HEADLIGHT.
APPLICATION FILED SEPT. 24, 1920.
1,426,963.  Patented Aug. 22, 1922.
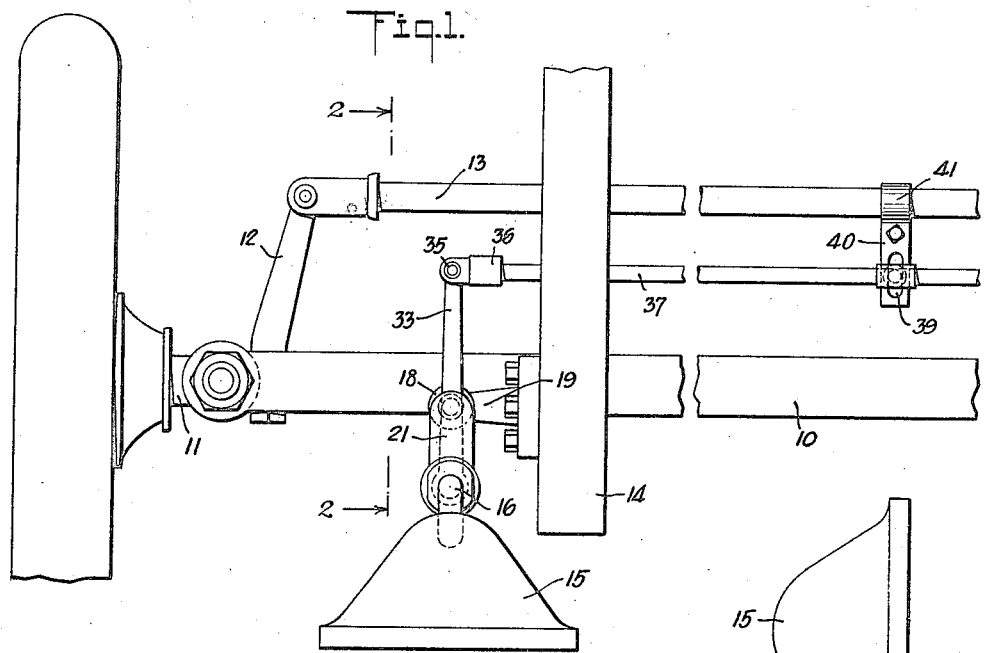
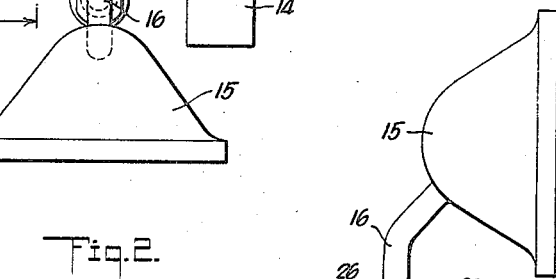
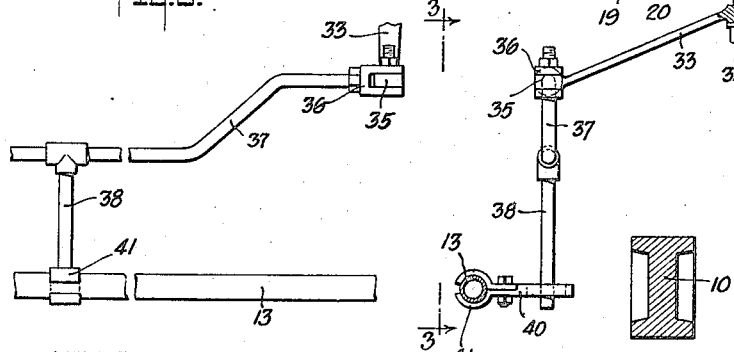
WITNESS
Frederick Diehl.
INVENTOR
G. W. J. Crabb
BY
Geo. L. Beeler
ATTORNEY

UNITED STATES PATENT OFFICE.

GEORGE W. J. CRABB, OF NEWARK, NEW JERSEY.

DIRIGIBLE HEADLIGHT.

1,426,963. Specification of Letters Patent. Patented Aug. 22, 1922.

Application filed September 24, 1920. Serial No. 412,476.

*To all whom it may concern:*

Be it known that I, GEORGE W. J. CRABB, a citizen of the United States, and a resident of Newark, in the county of Essex and State of New Jersey, have invented certain new and useful Improvements in Dirigible Headlights, of which the following is a specification.

This invention relates to road vehicles and has particular reference to traction vehicles, such as automobiles or the like.

Among the objects of the invention is to provide means for so manipulating or controlling the head lights of such vehicles as to cause them to automatically throw the beams of light either forward when the vehicle is moving forward, or to either side when the vehicle is about to take a curve to the right or to the left, and whereby the full purpose or object of the light will be subserved, especially at those times when the maximum light is desirable, it being well understood that in traveling at night the greatest use or necessity for the light is to avoid dangerous places along the roadway or other vehicles.

Another object of the invention is to provide a means whereby any owner or driver of a traction vehicle may readily equip such vehicle with my improvement, utilizing for the equipment the headlights and their brackets and other attaching means as furnished by the manufacturer. Thus it will be seen that to furnish and install my improvement may readily be accomplished both with facility and low cost.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a fragmentary plan view showing my improvement in connection with one of the head lamps of a well known type of automobile.

Fig. 2 is a vertical section on the line 2—2 of Fig. 1.

Fig. 3 is a vertical detail as would be seen from the plane indicated by the line 3—3 of Fig. 2.

Referring now more specifically to the drawings, I indicate my improvement applied to an automobile including a front axle 10, a steering knuckle 11, steering lever 12, tie rod 13, and frame 14. I wish it to be understood, moreover, that while I indicate in the drawings one well known type of machine, my invention is adapted for use in connection with any standard make of traction vehicle.

15 indicates one of the head lamps rigidly supported upon an upright shank 16 having a shouldered journal portion 17, adapted ordinarily to be set into the socket 18 of a standard bracket 19 furnished with the machine and fixed to the front end of the frame bar 14. The shank ordinarily is located in the socket 18 by means of a nut 20, cooperating with the threaded lower end of the shank which projects below the socket 18. As thus far described the parts are all standard and are furnished with the machine. While I show and describe but one of the head lights, it will be understood that any number of such lights may be employed, generally two, and a specific description of the construction, mounting and operation of one of them will be applicable to any number.

Whereas the automobile headlights are fixed rigidly in the brackets 19 under ordinary circumstances, it has been found highly desirable for them to be movable or dirigible laterally so as to throw beams of light ahead and laterally to illuminate the roadway or any dangerous curve or obstruction about to be met.

For each lamp I provide a special bracket 21 comprising a shank 22 constituting the counterpart of the shouldered shank portion 17 of the lamp shank and which consequently is adapted to be fitted and clamped directly in the original bracket 19 after the lamp shank is removed therefrom, the same nut 20 being employed for this purpose. The bracket 21 comprises a vertical barrel portion 23, one part of which constitutes a clamp 24 for locking a bearing sleeve 25 within said barrel and with its axis vertical and parallel to the axis of the shank 22.

26 indicates a combined coupling and bearing bushing. This member includes a downwardly projecting nipple 27 having an internal thread from one end to the other into the upper end of which the thread of the shouldered portion 17 of the lamp shank is screwed. After being thus attached to the lamp shank the bushing 26 is locked as by means of a set screw 28. It will be understood that the main body portion of this bushing is free to rotate within the upper end of the sleeve 25.

Within the lower end of the sleeve 25 is a bushing 29 within which is journaled a shank extension 30 having its upper end threaded and set into the lower end of the nipple 27, and preferably locked therein by means of a key at 31. After the parts thus far described are assembled a collar 32 is locked upon shank extension 30, and to the lower end of the shank extension is fixed an arm 33 as by means of a locking washer and nut 34. This arm 33 projects rearward and downward from the member 30 and is pivoted or swiveled at 35 in a knuckle 36 fixed to the end of a cross rod 37 which may be of any suitable length or shape, the same being indicated in Fig. 3 as being dropped at its middle portion to adapt it to other parts of the machine. A finger 38 is fixed to the dropped portion of the rod 37 and projects thence downward into or through a longitudinal slot 39 formed in a connector 40 clamped at 41 to the tie rod 13. The slot 39 serves to accommodate the fore and aft movements of the finger 38 incident to the swinging of the arms 33 around fixed vertical axes, but the normal movements of the tie rod 13 incident to the steering of the machine causes through the finger 38 corresponding and simultaneous lateral movements of the rod 37 and consequently the swinging of the lamp or lamps around their said vertical axes in the sleeve or sleeves 25.

I claim:

In a dirigible lamp construction the combination with a frame, a bracket fixed thereto and having a socket bore, a lamp having a shank of the same diameter as said socket bore and having a threaded end and a clamping nut mating said threaded end, of an auxiliary bearing bracket having a shank similar in diameter to the lamp shank and hence adapted for direct co-operation with the bracket first mentioned and to be locked by said nut, a combined coupling and bearing bushing having a socket to receive the lamp shank and having a threaded portion to receive the threaded end of the lamp shank, a shank extension threaded into the other end of the coupling in alignment with the lamp shank, and means to rotate the lamp through said extension.

GEORGE W. J. CRABB.